US011958309B2

(12) United States Patent
Prakash et al.

(10) Patent No.: US 11,958,309 B2
(45) Date of Patent: Apr. 16, 2024

(54) MULTI-MATERIAL FLUIDIC PRINTING SYSTEM AND METHOD OF PRINTING

(71) Applicant: Brinter Oy, Turku (FI)

(72) Inventors: Dhayakumar Rajan Prakash, Turku (FI); Tomi Kalpio, Turku (FI)

(73) Assignee: BRINTER OY, Turku (FI)

( * ) Notice: Subject to any disclaimer, the term of this patent is extended or adjusted under 35 U.S.C. 154(b) by 41 days.

(21) Appl. No.: 17/885,984

(22) Filed: Aug. 11, 2022

(65) Prior Publication Data

US 2024/0051322 A1 Feb. 15, 2024

(51) Int. Cl.
*B41J 2/175* (2006.01)
*B41M 7/00* (2006.01)

(52) U.S. Cl.
CPC ............ *B41M 7/0072* (2013.01); *B41J 2/175* (2013.01); *B41J 2/17556* (2013.01); *B41J 2/17596* (2013.01)

(58) Field of Classification Search
CPC .... B41M 7/0072; B41J 2/175; B41J 2/17556; B41J 2/17596
See application file for complete search history.

(56) References Cited

U.S. PATENT DOCUMENTS 8,708,453 B2 * 4/2014 Matsumoto .......... B41J 2/16508
347/30
9,724,930 B2 * 8/2017 Enomoto ................. B41J 2/175
2007/0115317 A1 5/2007 Nishida
2009/0203480 A1 * 8/2009 Petzold ............... F16H 61/2807
475/127
2011/0074873 A1 * 3/2011 Ito ........................ B41J 2/17596
347/30
2018/0201023 A1 7/2018 Sato et al.

OTHER PUBLICATIONS

International Search Report and Written Opinion of the International Searching Authority issued in International Patent Application No. PCT/FI2023/050453 dated Oct. 19, 2023.

* cited by examiner

*Primary Examiner* — Yaovi M Ameh
(74) *Attorney, Agent, or Firm* — BakerHostetler

(57) ABSTRACT

A multi-material fluidic printing system including pressure source; regulator(s) having first end(s) and second end(s), first end(s) fluidically coupled to pressure source; flow selector(s) having third end(s) and fourth ends; cartridges capable of holding fluid materials, cartridge having fifth end and sixth end, fifth end fluidically coupled to corresponding fourth end; processor(s) configured to: control pressure source to generate first pressure; control regulator(s) to regulate first pressure to obtain second pressure at second end(s); control flow selector(s) to selectively distribute second pressure received at third end(s) to obtain third pressure(s) on fourth end(s), so that fluid material(s) held in cartridge(s) corresponding to fourth end(s) is/are dispensed from sixth end(s) of cartridge(s) onto fluidic device.

14 Claims, 6 Drawing Sheets

MULTI-MATERIAL FLUIDIC PRINTING SYSTEM AND METHOD OF PRINTING

TECHNICAL FIELD

The present disclosure relates to multi-material fluidic printing systems. The present disclosure also relates to methods of printing using multi-material fluidic printing systems.

BACKGROUND

In recent times, microfluidics is emerging as an innovative technology due to its various applications. In this regard, said applications can be found in a variety of fields such as biochemistry, biotechnology, life sciences, pharmaceutical, etc. Typically, the microfluidics involves study and manipulation of a fluid at a very small scale, for example, a micron scale, nano scale, and so forth. A microfluidic delivery system typically delivers fluids to a microfluidic device, which further enables transporting, mixing, separating, or processing of the fluids for further use. The microfluidic device comprises a plurality micro channels and chambers in which the aforesaid processes take place. A prerequisite for microfluidics is effective, reliable and controlled delivery of the fluid to the microfluidic device.

A microfluidics delivery system involves multiple extrusion units for delivery of the fluid into the microfluidic device. However, there are several problems associated with the conventional microfluidic delivery systems in terms of a number of fluids that can be delivered, and efficiency of the delivery of the fluid into the microfluidic device. Firstly, in the conventional microfluidic delivery system, a very limited number of extrusion units are present. For example, the conventional microfluidic delivery systems can control extrusion of only three to ten fluids which adversely impact usability and efficiency of the microfluidic system. Secondly, the conventional microfluidic delivery systems do not have a precise control in terms of, for example, dispensing a required amount of the fluid that need to be delivered into the microfluidic device and often consumes a long time to deliver the fluid.

Therefore, in light of the foregoing discussion, there exists a need to overcome the aforementioned drawbacks associated with the existing microfluidic delivery systems.

SUMMARY

The present disclosure seeks to provide a multi-material fluidic printing system. The present disclosure also seeks to provide a method of printing using the multi-material fluidic printing system. An aim of the present disclosure is to provide a solution that overcomes at least partially the problems encountered in prior art.

In a first aspect, an embodiment of the present disclosure provides a multi-material fluidic printing system comprising:
- a pressure source;
- at least one regulator having at least one first end and at least one second end, wherein the at least one first end is fluidically coupled to the pressure source;
- at least one flow selector having at least one third end and a plurality of fourth ends, wherein the at least one third end is fluidically coupled to the at least one second end;
- a plurality of cartridges that are capable of holding a plurality of fluid materials, wherein each cartridge has a fifth end and a sixth end, the fifth end being fluidically coupled to a corresponding fourth end amongst the plurality of fourth ends; and
- at least one processor coupled to the pressure source, the at least one regulator, and the at least one flow selector, wherein the at least one processor is configured to:
  - control the pressure source to generate a first pressure;
  - control the at least one regulator to regulate the first pressure received at the at least one first end to obtain a second pressure at the at least one second end, wherein the second pressure is less than the first pressure; and
  - control the at least one flow selector to selectively distribute the second pressure received at the at least one third end to obtain at least one third pressure on at least one fourth end amongst the plurality of fourth ends, wherein when at least one fifth end fluidically coupled to the at least one fourth end is subjected to the at least one third pressure, at least one fluid material held in at least one cartridge corresponding to the at least one fourth end is dispensed from at least one sixth end of the at least one cartridge onto a fluidic device.

In a second aspect, an embodiment of the present disclosure provides a method of printing using a multi-material fluidic printing system according to the first aspect, the method comprising:
- controlling a pressure source for generating a first pressure;
- controlling at least one regulator to regulate the first pressure received on at least one first end thereof for obtaining a second pressure on at least one second end thereof, the at least one first end being fluidically coupled to the pressure source, wherein the second pressure is less than the first pressure; and
- controlling at least one flow selector to selectively distribute the second pressure received on at least one third end thereof for obtaining at least one third pressure on at least one fourth end amongst a plurality of fourth ends thereof, the at least one third end being fluidically coupled to the at least one second end, wherein when at least one fifth end of at least one cartridge that is fluidically coupled to the at least one fourth end is subjected to the at least one third pressure, at least one fluid material held in the at least one cartridge corresponding to the at least one fourth end is dispensed from at least one sixth end of the at least one cartridge onto a fluidic device.

Embodiments of the present disclosure substantially eliminate or at least partially address the aforementioned problems in the prior art, and enable selective pressure distribution for enabling at least highly-controlled and selective extrusion of any required number of fluid materials from the at least one cartridge of the multi-material fluidic printing system at a given time, as per requirement.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
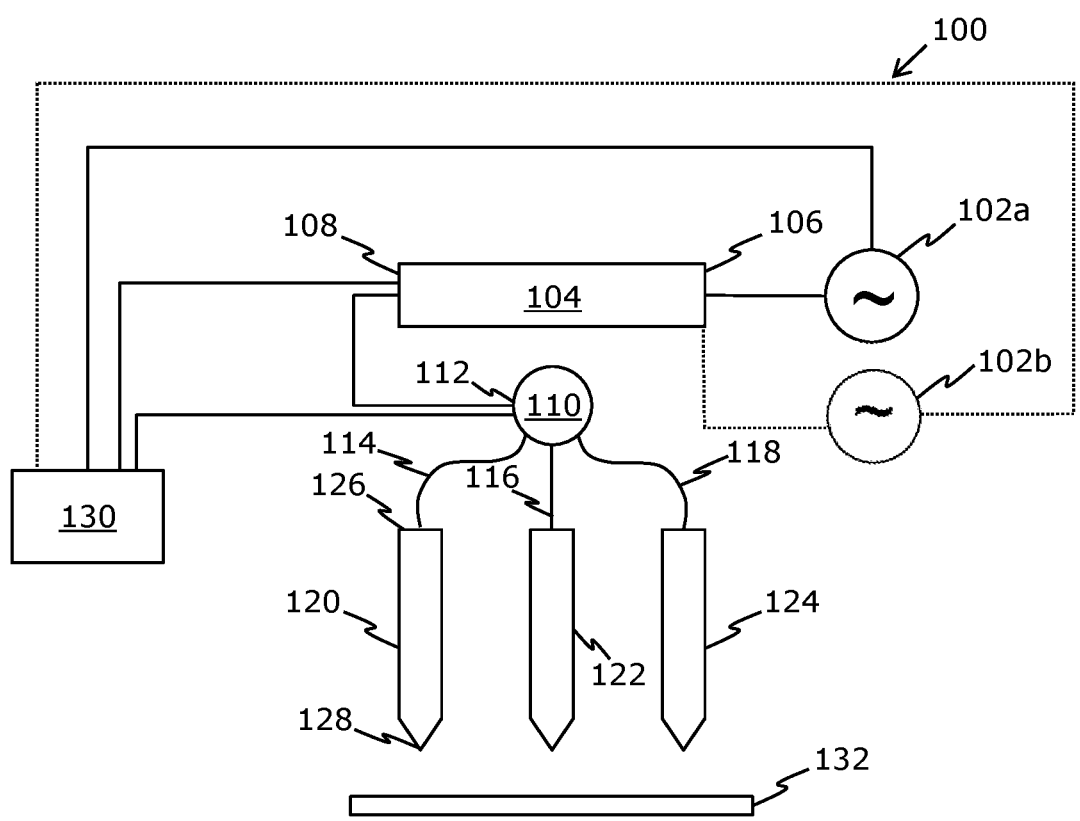
FIGS. 1A and 1B are schematic illustrations of a multi-material fluidic printing system, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a multi-material fluidic printing system comprising:
  a pressure source;
  at least one regulator having at least one first end and at least one second end, wherein the at least one first end is fluidically coupled to the pressure source;
  at least one flow selector having at least one third end and a plurality of fourth ends, wherein the at least one third end is fluidically coupled to the at least one second end;
  a plurality of cartridges that are capable of holding a plurality of fluid materials, wherein each cartridge has a fifth end and a sixth end, the fifth end being fluidically coupled to a corresponding fourth end amongst the plurality of fourth ends; and
  at least one processor coupled to the pressure source, the at least one regulator, and the at least one flow selector, wherein the at least one processor is configured to:
    control the pressure source to generate a first pressure;
    control the at least one regulator to regulate the first pressure received at the at least one first end to obtain a second pressure at the at least one second end, wherein the second pressure is less than the first pressure; and
    control the at least one flow selector to selectively distribute the second pressure received at the at least one third end to obtain at least one third pressure on at least one fourth end amongst the plurality of fourth ends, wherein when at least one fifth end fluidically coupled to the at least one fourth end is subjected to the at least one third pressure, at least one fluid material held in at least one cartridge corresponding to the at least one fourth end is dispensed from at least one sixth end of the at least one cartridge onto a fluidic device.

In a second aspect, an embodiment of the present disclosure provides a method of printing using a multi-material fluidic printing system according to the first aspect, the method comprising:
  controlling a pressure source for generating a first pressure;
  controlling at least one regulator to regulate the first pressure received on at least one first end thereof for obtaining a second pressure on at least one second end thereof, the at least one first end being fluidically coupled to the pressure source, wherein the second pressure is less than the first pressure; and
  controlling at least one flow selector to selectively distribute the second pressure received on at least one third end thereof for obtaining at least one third pressure on at least one fourth end amongst a plurality of fourth ends thereof, the at least one third end being fluidically coupled to the at least one second end, wherein when at least one fifth end of at least one cartridge that is fluidically coupled to the at least one fourth end is subjected to the at least one third pressure, at least one fluid material held in the at least one cartridge corresponding to the at least one fourth end is dispensed from at least one sixth end of the at least one cartridge onto a fluidic device.

The present disclosure provides the aforementioned multi-material fluidic printing system and the aforementioned method for printing. The at least one third pressure that is selectively applied to the at least one fourth end enables extrusion of the at least one fluid material filled in the at least one cartridge depending upon need of a user. Beneficially, the user can choose the at least one cartridge from which the at least one fluid material needs to be extruded by directing the at least one third pressure at the at least one fourth end corresponding to the at least one cartridge. Advantageously, while using the multi-material fluidic printing system, the user can control different combinations of the plurality of cartridges to achieve extrusion of the at least one fluid material held in the at least one cartridge as required. For example, the user can choose to extrude from at least one of: one cartridge, multiple cartridges, entirety of cartridges at a same time depending upon requirement. Optionally, upon increasing a number of the at least one regulator and the at least one flow selector, the number and combinations of the plurality of cartridges can be increased. This means that the multi-material fluidic printing system is highly scalable using inexpensive and easy to procure components. For instance, the multi-material fluidic printing system may enable extrusion of more than sixteen fluid materials using only one regulator and flow selector. In another instance, the multi-material fluidic printing system may enable extrusion of more than four thousand fluid materials using more than three regulators and flow selectors. More advantageously, the multi-material fluidic printing system is reliable, precisely controllable, inexpensive and saves energy. The method of printing using the multi-materials fluidic printing system is simple, fast and easy to perform.

The term "pressure source" refers to a device that, in operation, generates a pressure in the multi-material fluidic printing system. The pressure generated by the pressure source is exerted upon other components of the multi-material fluidic printing system to precisely infuse the plurality of fluid materials into the plurality of cartridges or to dispense the plurality of fluid materials from the plurality of cartridges. The pressure could be generated using at least one of: air, liquid. Examples of air include, but are not limited to, argon, helium, nitrogen, xenon. The pressure generated by the pressure source could be at least one of: a positive pressure, a negative pressure. The pressure could lie in a range of minus 5 bar to 5 bar. The pressure source could be at least one of: a displacement pump, a dynamic pump, a piezo pump. Example of the displacement pump include, but are not limited to, reciprocating pump, and rotating pump. The reciprocating pump could have at least one of: a plunger, a piston, a diaphragm, and the like. The rotatory pump may have at least one of: a single rotor, a multiple rotor. Examples of the dynamic pump include, but are not limited to, centrifugal pump, and special effect pump. The centrifugal pump could be at least one of: an axial flow pump, a mixed flow pump, a peripheral pump. Examples of the special effect pump include, but are not limited to, a jet pump, an electromagnetic pump.

Optionally, the pressure source is implemented as one of: a compressor, a vacuum pump. In one implementation, the pressure source may be the compressor. In said implementation, the compressor is used to generate a positive pressure. The term "positive pressure" refers to the pressure generated by the pressure source to facilitate downward flow of the plurality of fluid materials filled in the plurality of cartridges. The positive pressure leads to dispensation of the plurality of fluid materials from the plurality of cartridges. In another implementation, the pressure source may be the vacuum pump. In said implementation, the vacuum pump is used to generate a negative pressure. The term "negative pressure" refers to the pressure generated by the pressure source to facilitate infusion of the plurality of fluid materials in corresponding plurality of cartridges from a plurality of containers as described below. The negative pressure is obtained by creating vacuum in the multi-material fluidic printing system. The terms "positive" and "negative" used hereinabove indicate a direction of pressure, wherein "positive" pressure means that the pressure is exerted outwards from the pressure source whereas "negative" pressure means that the pressure is exerted inwards into the pressure source. Advantageously, the technical effect of using the different types of the pressure source is that the multi-material can accurately dispense or infuse the plurality of fluid materials using dedicated pressure sources.

The term "regulator" refers to a device that, in operation, controls (i.e., regulates) pressure at its ends, as required. Since a given pressure generated by the pressure source may be different from a required pressure for dispensing/infusing a given fluid material, the at least one regulator is required to control the pressure at its ends to provide the required pressure. In particular, the at least one regulator controls the first pressure received at the at least one second end to obtain the second pressure at the at least one third end. Herein, the at least one regulator is fluidically coupled to the pressure source. A number of the at least one regulator may depend upon a number of the pressure source used in the multi-material fluidic printing system. For example, for one pressure source, there may be one regulator. Optionally, the number of the at least one regulator depends upon a number of the at least one flow selector. For example, for three flow selectors, the multi-material fluidic system may have three regulators. Notably, the at least one regulator has a body comprising the at least one first end and the at least one second end. The at least one first end is fluidically coupled to the pressure source. Optionally, the at least one first end is fluidically coupled to the pressure source using at least one valve. Optionally, a type of the at least one regulator depends upon a magnitude of the pressure generated by the pressure source. The at least one regulator could be selected from at least one of: a high-pressure regulator, a low-pressure regulator, a back pressure regulator, a vacuum pressure regulator, a differential pressure regulator. Notably, the at least one regulator is communicably coupled to the at least one processor. Herein the at least one processor controls the at least one regulator to regulate the pressure received at the at least one first end as described in below paragraphs. Optionally, the at least one regulator is manually controlled. For example, the at least one regulator may have at least one knob. The at least one knob could be rotated to control the pressure received at the at least one first end. Optionally, the at least one regulator has at least one first valve to control the first pressure received at the at least one first end and the second pressure obtained at the at least one second end.

The term "flow selector" refers to a device that, in operation, selects at least one cartridge amongst the plurality of cartridges for extrusion or infusion of fluid material(s). Optionally, the at least one flow selector has at least one fluidic channel connecting the at least one third end and at least one fourth end amongst the plurality of fourth ends. A number of the fluidic channel may depend upon a number of the plurality of fourth ends. Notably, the at least one third end of the at least one flow selector is fluidically coupled to the at least one second end of the at least one regulator. Optionally, a number of the at least one third end depends upon a number of the at least one second end. For example, for one second end, the at least one flow selector has one third end. Optionally, the at least one third end is fluidically coupled to the at least one second end using at least one valve. Notably, the plurality of fourth ends are fluidically coupled to the plurality of cartridges at corresponding fifth ends. The plurality of fourth ends are fluidically coupled to the corresponding fifth ends using at least one second valve.

The term "cartridge" refers to a casing that is capable of holding a fluid material inside it. Optionally, each of the plurality of cartridges comprises a body having the fifth end and the sixth end. Notably, the fifth end is fluidically coupled to a corresponding fourth end of the plurality of fourth ends of the flow selector. The fifth end is fluidically coupled to the corresponding fourth end using at least one third valve. Optionally, a number of the plurality of cartridges is equivalent to a number of the plurality of fourth ends. Optionally, the plurality of cartridges could be made of a material such that the material is non-reactive in nature and does not interfere with chemical/physical properties of the plurality of fluid materials filled inside the plurality of cartridges. The material could be selected from at least one of: a plastic, a polymer, a metal. Optionally, the plurality of cartridges could be transparent or translucent, so that the plurality of fluid materials filled in is visible to the user. More optionally, a given cartridge has a required volume depending upon need of the user. For example, the required volume could lie in a range of 1 femtoliter to 1 decilitre. Each of the plurality of cartridges may have same volume or different volume. Optionally, the plurality of cartridges are implemented as at least two of: a syringe barrel, a reservoir. In one example, the plurality of cartridges may be at least one syringe barrel and at least one reservoir. In another example, the plurality of cartridges may be a plurality of syringe barrels. In yet another example, the plurality of cartridges may be the plurality of reservoirs arranged together.

The term "processor" refers to a computational element that is operable to respond to and process instructions. Furthermore, the term "processor" may refer to one or more individual processors, processing devices and various elements associated with a processing device that may be shared by other processing devices. Such processors, processing devices and elements may be arranged in various architectures for responding to and executing processing steps.

The at least one processor is coupled to the to the pressure source, the at least one regulator, and the at least one flow selector. Optionally, the at least one processor is configured to execute at least one software application for implementing at least one processing task that the at least one processor is configured for.

Herein, the term "software application" refers to an application program or a computer program designed for performing a specific task with respect to multi-material fluidic printing, such as multi-material dispensing, multi-material infusion and/or storing information related to the multi-material fluidic printing and a desired size of the fluidic device. In an embodiment, the software application may be a multi-material fluidic printing software for facilitating the extrusion of the plurality of fluid materials. Moreover, the software application may be a software file containing data such as process parameters, pre-defined set of parameters, and so forth. Typically, the pre-defined set of parameters could be the data regarding a type of the plurality of fluid materials, a pre-defined density of the plurality of fluid material, a pre-defined volume of the plurality of fluid material, pressure parameters (the first pressure, the second pressure, the at least one third pressure) for extruding the plurality of fluid materials from the plurality of cartridges, and pressure parameters (described in below paragraphs) for infusing the plurality of fluid materials into the plurality of cartridges.

Notably, in one implementation of the multi-material fluidic printing system, the at least one processor is configured to control the pressure source to generate the first pressure. Herein, the first pressure generated by the pressure source is the positive pressure. Optionally, the first pressure has a required magnitude lying in range of minus 5 bar to 5 bar. The first pressure is received at the at least one first end of the at least one regulator. The at least one processor detects the first pressure received at the at least one first end and controls the at least one regulator to reduce the first pressure to obtain the second pressure at the at least one second end of the at least one regulator. For example, the first pressure received at the at least one first end may be 5 bar, and the at least one regulator may reduce it to 2 bar depending upon need for extrusion of the at least one fluid material filled in the at least one cartridge. Optionally, the second pressure could lie in a range of 1 millibar to 5 bar. Optionally, the second pressure lies in a range of 1 percent-50 percent of the first pressure.

The second pressure obtained at the at least one second end is received at the at least one third end of the at least one flow selector. Notably, the at least one processor controls the at least one flow selector to selectively distribute the at least one third pressure on the at least one fourth end amongst the plurality of fourth ends. The term "selectively distribute" refers to distribution of the second pressure as per requirement of the user, on selected fourth end(s) amongst the plurality of fourth ends. For example, the multi-material fluidic printing system may have three cartridges and the user may want to dispense the at least one fluid material from a first cartridge and a third cartridge. In such case, the at least one processor may control the at least one flow selector to distribute the second pressure to fourth ends corresponding to the first cartridge and the third cartridge. The at least one third pressure could lie in a range of minus 5 bar to 5 bar.

Optionally, the at least one flow selector is implemented as at least one of: a switching valve comprising a plurality of ports, a solenoid array. Technical effect of these implementations is that extrusion and infusion of the at least one fluid material can be precisely and selectively controlled, thereby resulting in efficient functioning of the multi-material fluidic printing system. In one implementation, the at least one flow selector may be the switching valve comprising the plurality of ports. For example, the switching valve may have seven ports. One of the seven ports may be implemented as a third end and rest of the six ports may be implemented as the plurality of fourth ends. Herein, the third end forms a fluidic passage with one fourth end amongst the plurality of fourth ends, at a given time. Owing to the above, the at least one flow selector allows dispensation of a fluid material held in one selected cartridge at the given time. Optionally, extrusion from a given cartridge is controlled by controlling a third pressure on its corresponding fourth end. Optionally, any one of the plurality of cartridges is selected for extrusion depending upon need of the user. A possibility of selecting a given cartridge is calculated as follows:

$$(1/x1)+(1/x2)+ \ldots$$

xi represents a given fourth end implemented as a port in a given switching valve. i=1, 2, 3 . . . n In a first example, the multi-material fluidic printing system may have one pressure source to generate the first pressure. The pressure source is fluidically coupled with one regulator at a first end. A second end of the regulator may be fluidically coupled with a third end of a flow selector. The flow selector may be implemented as the switching valve comprising a plurality of ports. The flow selector may have three fourth ends fluidically coupled to three cartridges, say for example, a first cartridge filled with the fluid material M1, a second cartridge filled with the fluid material M2, a third cartridge filled with the fluid material M3. Herein, the at least one processor is configured to control the pressure source to generate the first pressure of 6 bar. The first pressure of 6 bar may be received at the second end of the regulator. The at least once processor may control the regulator to obtain the second pressure of 3 bar at the second end. Further, the second pressure of 3 bar may be received at the third end of the flow selector. Further, the at least one processor may control the flow selector to selectively distribute the second pressure to obtain third pressures of 1 bar, 3 bar, and 6 bar at the first cartridge, the second cartridge and the third cartridge respectively. Herein, the fluid materials M1, M2 and M3 are dispensed from the first cartridge, the second cartridge and the third cartridge respectively one by one.

In another implementation, the at least one flow selector may be the solenoid array. In the solenoid array, the third end is coupled to each of the plurality of fourth ends to form a plurality of fluidic passages. Owing to the above, the solenoid array allows extrusion of two or more fluid materials from two or more cartridges simultaneously at a given time. Optionally, the solenoid array allows selection of at least two cartridges at a given time. Referring to the first example, the solenoid array may enable extrusion of all three fluid materials M1 M2 and M3 from the first cartridge, the second cartridge and the third cartridge, respectively, at the same time. Alternatively, the solenoid array may enable extrusion of fluid materials M1 and M2, fluid materials M2 and M3, fluid materials M1 and M3 at the given time, depending upon requirement of the user. Herein, a possibility of selecting a given cartridge is calculated as follows:

$$(1 \text{ to } n/y1) + (1 \text{ to } n/y2) + \ldots$$

n is the number of the plurality of cartridges (corresponding to the plurality of fourth ends) to be selected, yi represents a given fourth end in a given flow selector implemented as the solenoid array. i=1, 2, 3 . . . n In yet another implementation, the at least one flow selector may be a combination of one switching valve comprising a plurality of ports, and one solenoid array. Herein, a possibility of selecting a given cartridge is calculated as follows:

$$((1/x1) + (1 \text{ to } n)/y1) + \ldots$$

xi represents a given fourth end implemented as a port in a given switching valve, n is the number of the plurality of cartridges (corresponding to the plurality of fourth ends) to be selected and yi represents a given fourth end in a given flow selector implemented as the solenoid array. i=1, 2, 3 . . . n Notably, upon receiving a required amount of the at least one third pressure, the fifth end of the at least one cartridge which is fluidically coupled to the at least one fourth end is subjected to the at least one third pressure, thereby resulting in dispensation of the at least one fluid material held in the corresponding cartridge. Optionally, a given third pressure that is subjected upon a given fourth end and its corresponding fifth end depends on at least one of: a viscosity of the at least one fluid material, a density of the at least one fluid material, a surface tension of the at least one fluid material, nature of the at least one fluid material, shear stress of the at least one fluid material held in the at least one cartridge. In a first example, the at least one fluid material having high viscosity may be required to have a high magnitude of the at least one third pressure, for dispensation from the at least one cartridge. In a second example, the at least one fluid material having low density may be required to have a high magnitude of the at least one third pressure, for dispensation from the at least one cartridge. In a third example, the at least one fluid material having high shear stress may be required to have a high magnitude of the at least one third pressure, for dispensation from the at least one cartridge. Optionally, the magnitude of the at least one third pressure is reduced by adding at least one shear thinning material in the at least one fluid material. The nature of the at least one fluid material could be hydrophobic or hydrophilic. The nature of the at least one fluid material may depend upon the surface tension, grain size, and polarity of the at least one fluid material. Further, the given third pressure may also depend upon a cartridge heater. The cartridge heater may increase activation energy of the at least one fluid material resulting in a less magnitude of the at least one third pressure, for dispensation from the at least one cartridge. Optionally, the given third pressure also depends on at least one of: a required speed of extrusion of the at least one fluid material from the at least one cartridge, an amount of the at least one fluid material that is required to be extruded. In a first example, a high speed of extrusion of the at least one fluid material from the at least one cartridge may be obtained by exerting a high magnitude of the at least one third pressure. In a second example, extrusion of a high amount of the at least one fluid material in a required time may be achieved by exerting a high magnitude of the at least one third pressure.

The term "fluidic device" refers to a fluidic equipment that is capable of receiving the plurality of fluid materials from the plurality of cartridges. The fluidic device has a plurality of fluidic channels to receive the plurality of fluid materials from the plurality of cartridges. In use, the fluidic device receives at least one fluid material from the at least one cartridge. The fluidic device is used for manipulation of the at least one fluid material in at least one of: a micronscale, nanoscale, pico-scale, a femto-scale. Optionally, the fluidic device has different geometries depending upon requirement of the user. Examples of geometries include, but are not limited to, a crossflow geometry, a T junction geometry, and a double T junction geometry. Optionally, the fluidic device has a plurality of accumulation chambers for mixing the plurality of fluid materials. The fluidic device could be made of materials selected form at least one of: a glass, an acrylic, a polymer. To receive the at least one fluid material, the fluidic device is positioned at a required distance, in a required orientation with respect to the plurality of cartridges, such that the fluidic device can accurately receive the at least one fluid material inside at least one of the plurality of fluidic channels. Optionally, the fluidic device is positioned using at least one of: a robot, a machine with a robotic arm, a person. Optionally, a plurality of fluidic devices may be employed, wherein a number of the plurality of fluidic devices depends upon requirement of the user. For example, there may be only one fluidic device to receive the at least one fluid material from the plurality of cartridges. As another example, there may be multiple fluidic devices for receiving the plurality of fluid materials from the plurality of cartridges. Upon receiving the at least one fluid material, the fluidic device can be used for various applications. Various applications could be at least one of: DNA sequencing, biochemical assay, drug screening, drug administration, chromatography, gradient generation, cell analysis. It will be appreciated that various pharmaceutical applications of the multi-material fluidic printing system are well within the scope of the present disclosure. Optionally, the fluidic device is implemented as at least one of: a fluidic manifold, a fluidic chip. Optionally, a given fluid material is at least one of: a binder, an excipient, a cell culture media, a reagent, an immobilizing agent, an activator, a drug. For example, cell, substrate and media can be mixed in a required combination in the fluidic device to mimic complex tissue architecture. It will be appreciated that other numerous types of fluid materials are well within the scope of the present disclosure. Moreover, various other applications can also be performed using the multi-material fluidic printing system. In one example, the at least one fluid material from the multi-material fluidic printing system can be delivered to a slot die head to facilitate coating of membranes, coating antibodies on thin strips to be used in lateral flow device (LFD), such as coronavirus disease (COVID) test, pregnancy test, and the like. In another example, the at least one fluid material can be delivered for membrane fabrication, immobilization of synthetic and biological molecules for wound regeneration.

Optionally, the multi-material fluidic printing system further comprises a plurality of containers that are capable of holding the plurality of fluid materials, the plurality of containers corresponding to the plurality of cartridges, wherein when at least one sixth end of at least one cartridge is dipped in at least one fluid material held in at least one corresponding container, the at least one processor is further configured to:

control the pressure source to generate a fourth pressure;
control the at least one regulator to regulate the fourth pressure received at the at least one first end to obtain a fifth pressure at the at least one second end, wherein the fifth pressure is higher than the fourth pressure; and
control the at least one flow selector to selectively distribute the fifth pressure received at the at least one third end to obtain at least one sixth pressure on the at least one fourth end corresponding to the at least one cartridge dipped in the at least one fluid material, wherein when at least one fifth end of the at least one cartridge that is fluidically coupled to the at least one fourth end is subjected to the at least one sixth pressure, the at least one fluid material held in the at least one container is filled into the at least one cartridge from the at least one sixth end.

In this regard, a number of the plurality of containers is equivalent to the number of the plurality of cartridges. Optionally, each of the plurality of containers is filled with one fluid material. Alternatively, optionally, two or more of the plurality of containers are filled with a same fluid material. Herein, the sixth end of each of the plurality of cartridges is dipped in the fluid material filled in the plurality of containers. The plurality of cartridges are dipped to enable infusion of the fluid material from the plurality of containers into the plurality of cartridges. Optionally, the plurality of containers are dipped using at least one of: the robot, the machine with a robotic arm, the person.

Notably, to infuse the at least one fluid material, the at least one processor is configured to control the pressure unit to produce the fourth pressure. Here, the fourth pressure generated by the pressure unit is the negative pressure. Optionally, the fourth pressure has a required magnitude lying in range of minus 5 bar to 5 bar. The fourth pressure generated by the pressure source is received at the at least one first end of the at least one regulator. Herein, the at least one processor detect the fourth pressure received at the at least one first end and control the at least one regulator to obtain the fifth pressure at the at least one second end of the at least one regulator. Notably, the fifth pressure is higher than the fourth pressure. A higher fifth pressure at the at least one second end enables effective infusion of the plurality of fluid material into the plurality of cartridges. Optionally, the fifth pressure lies in a range of minus 6 bar to 6 bar.

Notably, the at least one processor controls the at least one flow selector to control the fifth pressure to obtain the at least one sixth pressure on the at least one fourth end amongst the plurality of fourth ends. Optionally, a number of the at least one fourth end is same as the number of the cartridge(s) that need to be filled. In other words, the at least one fourth end corresponds to the at least one cartridge needs to be filled with the fluid material. The at least one sixth pressure could lie in a range of minus 5 bar to 5 bar. Optionally, the at least one sixth pressure at the at least one fourth end depends upon at least one of: viscosity of the at least one fluid material, density of the at least one fluid material, surface tension of the of the at least one fluid material filled in the plurality of containers. For example, the at least one fluid material having greater viscosity may be required to have a large magnitude of the at least one sixth pressure for filling the at least one cartridge with a fluid material from the corresponding container.

Notably, upon receiving a required amount of the at least one sixth pressure, the fifth end of the at least one cartridge which is fluidically coupled to the at least one fourth end receives the at least one sixth pressure. Owing to the negative pressure, the fluid material held in the corresponding container get sucked into the corresponding cartridge resulting in filling of the same as per requirement of the user. Advantageously, technical effect of the negative pressure is that the at least one fluid material can be precisely filled in the at least one cartridge, thereby enabling extrusion of the at least one fluid material for adequate functioning of the multi-material fluidic printing system.

Optionally, the at least one of: the at least one third pressure, the at least one sixth pressure, at the plurality of fourth ends is controlled by regulating diameters of the plurality of fourth ends. By the phrase "regulating diameters", it is meant that a diameter of a fourth end is regulated (i.e., adjusted or changed) manually by replacing hardware components, as required. In this regard, the plurality of fourth ends of the at least one flow selector can be understood to have an adjustable diameter. The adjustable diameter could lie in a range of 1 micrometer to 999 millimeter. For example, there may be five fourth ends, wherein diameters of the five fourth ends could be regulated in several ways such as all the five fourth ends may have different diameters, two of the five fourth ends may have same diameters while others may have different diameters, and various other combinations, depending upon requirement of the user. Optionally, a diameter can be regulated (i.e., adjusted or changed) automatically by at least one processor and by using e.g., an inflatable rubber ring or an adjustable sleeve at the plurality of fourth ends. Optionally, a diameter can be regulated automatically by at least one processor by changing a temperature at the plurality of fourth ends wherein a temperature sensitive material is used at the plurality of fourth ends. Advantageously, the technical effect of regulating the diameters of the plurality of fourth ends is that the plurality of fluid materials are manipulated with enhanced precision for extrusion from the plurality of cartridges and infusion into the plurality of cartridges. For example, a fourth end having a large diameter exerts less pressure on the fifth end of the corresponding cartridge as compared to another fourth end having a small diameter. More advantageously, controlling the diameters of the plurality of fourth ends effectively reduces a dead volume in the plurality of cartridges while extruding the plurality of fluid materials. Herein, the term "dead volume" refers to the volume of the fluid material that remains in the corresponding cartridge after extrusion.

Optionally, the multi-material fluidic printing system further comprises inbuilt regulators that are capable of controlling at least one of: the at least one third pressure, the at least one sixth pressure, at the plurality of fourth ends, wherein the inbuilt regulators are provided at the plurality of fourth ends. In this regard, the inbuilt regulators could be at least one of: the high-pressure regulator, the low-pressure regulator, the back pressure regulator, the vacuum pressure regulator, the differential pressure regulator. Optionally, each of the plurality of fourth ends have at least one inbuilt regulator. Optionally, the inbuilt regulators corresponding to the plurality of fourth ends are communicably coupled to the at least one processor. Herein, the at least one processor controls the inbuilt regulators to regulate the at least one third pressure and the at least one sixth pressure at the corresponding fourth ends. Optionally, the inbuilt regulators are manually controlled. Advantageously, the technical effect of providing the inbuilt regulators is that the at least one third pressure and the at least one sixth pressure can be obtained accurately (i.e., precisely) with ease.

Optionally, the multi-material fluidic printing system further comprises at least one fluidic manifold when the at least one regulator comprises a plurality of regulators, wherein the at least one fluidic manifold has: a seventh end fluidically coupled to the pressure source, and a plurality of eighth ends fluidically coupled to first ends of the plurality of regulators. In this regard, the at least one fluidic manifold has a plurality of channels connecting the seventh end and the plurality of eighth end. The plurality of channels may be arranged in a required configuration depending on need of the user. Herein, the first pressure generated by the pressure source is received by the seventh end of the fluidic manifold. The first pressure received at the seventh end is distributed in a required manner to obtain at least one seventh pressure on at least one eighth end amongst the plurality of eighth ends.

Notably, the plurality of eighth ends are fluidically coupled to the first ends of the plurality of regulators. Optionally, the plurality of eighth ends are fluidically coupled to the first ends of the plurality of regulators using at least one fourth valve. Optionally, the plurality of regulators are coupled with the at least one processor. Herein, the at least one fluidic manifold is arranged between the pressure source and the plurality of regulators to divide the first pressure before being exerted upon the plurality of regulators. For example, the at least one fluidic manifold may have one seventh end and three eighth ends. There may be three regulators fluidically coupled with three eighth ends of the at least one fluidic manifold. The first pressure of 6 bar may be generated from the pressure source and received at the seventh end. Upon receiving the first pressure of 6 bar, the at least one fluidic manifold may divide the aforesaid pressure in 2 bar at each of the eighth ends. In a next step, the at least one processor may control the plurality of regulators to obtain a pressure of 0.2 bar, 0.35 bar, and 0.45 bar at second ends of the three regulators. Advantageously, the technical effect of employing the at least one fluidic manifold is that the at least one fluidic manifold assists the plurality of regulators in effectively controlling the first pressure, thereby reducing burden on the plurality of regulators and the at least one processor. Owing to the above, performance of the multi-material fluidic printing system is significantly improved.

Optionally, the multi-material fluidic printing system further comprises at least one heating element and at least one cooling element coupled to the at least one processor, wherein the at least one processor is configured to control the at least one heating element and the at least one cooling element to provide a required temperature at the plurality of fourth ends, the required temperature lying in a range of minus 200 degrees Celsius to 1200 degrees Celsius. In this regard, the required temperature of the plurality of fourth ends depends upon the plurality of fluid materials already filled in the plurality of cartridges or to be filled in the plurality of cartridges. For example, the required temperature may be from minus 200 degrees Celsius, minus 100 degrees Celsius, 0 degrees Celsius, 200 degrees Celsius, 500 degrees Celsius, or 800 degrees Celsius up to, 100 degrees Celsius, 400 degrees Celsius, 700 degrees Celsius, 900 degrees Celsius, 1100 degrees Celsius, or 1200 degrees Celsius. Optionally, the at least one heating element and the at least one cooling element is implemented as a ceramic heater and liquid nitrogen-based cooling element, respectively. Advantageously, the technical effect of controlling the temperature of the plurality of fourth ends is to preserve chemical/physical properties of the plurality of fluid materials held in the plurality of cartridges.

Optionally, the multi-material fluidic printing system further comprises at least one ultraviolet (UV) source that, in operation, generates UV radiations, wherein the at least one UV source is controllable for at least one of: disinfecting the multi-material fluidic printing device, crosslinking a plurality of constituents of the plurality of fluid materials filled in the plurality of cartridges. In this regard, at a given time, the at least one UV source generates the UV radiations of a required intensity or required intensities, depending upon a required use of the UV radiations and properties of the plurality of fluid materials. The at least one UV source may be controllable to change the required intensity of the UV radiations with time. For example, the plurality of fluid materials may include different types of binders. Therefore, depending upon properties of the different types of binders, required intensities of UV radiations may be different. The required intensities could lie in a range of 1 milliwatt/cm$^2$ to 25 Watt/cm$^2$. Optionally, a wavelength of the UV radiations could lie in a range of 100 nanometers to 400 nanometers. Referring to the first example, while extruding the fluid material M1, the at least one UV source may produce UV radiation of 100% intensity, while extruding the material M2, the at least one UV source may produce UV radiation of 50% intensity, while extruding the material M3, the at least one UV source may produce UV radiation of 25% intensity.

In some implementations, the at least one UV source is used for disinfection of at least one of: the at least one fluid material, the at least one cartridge, the at least one container. The aforesaid disinfection is required to avoid contamination of the at least one fluid material. In other implementations, the at least one UV source may be controlled to produce the UV radiations having required intensity(-ies) for cross-linking the plurality of constituents of the plurality of fluid materials, or to activate pharmaceutical constituents to form a required formulation of a predefined consistency, or similar. For example, the required formulation could be in a form of at least one of: a gel, a liquid, a solid. Optionally, the at least one UV source is positioned such that the plurality of fluid materials in at least one of: the plurality of cartridges, the plurality of containers, the fluidic device is exposed to the UV radiations. Optionally, the at least one UV source is coupled with the at least one processor. Herein, the at least one processor is configured to control the at least one UV source to produce the UV radiations of the required intensity or the required intensities. Optionally, the at least one UV source is controlled based on an input provided by the user. Optionally, the at least one UV source is implemented as at least one of: an UV light emitting diode (LED), an UV lamp. Advantageously, the technical effect of utilizing and controlling the at least one UV source is that the UV radiations can be effectively and precisely utilized for one or more specialized purposes in the multi-material fluidic printing system.

Optionally, the multi-material fluidic printing system further comprises at least one Infrared radiation (IR) source that is controllable to excite the plurality of fluid materials filled in at least one of: the plurality of cartridges, the plurality of containers. Optionally, the at least one IR source produces infrared radiation of required intensity. The excitation of the plurality of fluid materials is performed to activate the plurality of fluid materials to form the required formulation of a predefined consistency, or similar. Optionally, the at least one IR source is implemented as at least one of: an IR light emitting diode (LED), a tungsten halogen lamp. Additionally, optionally, the multi-material fluidic printing further comprises at least one magnet that is controllable to at least excite the plurality of fluid materials filled in at least one of: the plurality of cartridges, the plurality of containers. Optionally, the at least one magnet is implemented as a magnetic encoder to detect linear displacement of at least one of: the plurality of cartridges, the fluidic device.

The present disclosure also relates to the method as described above. Various embodiments and variants disclosed above, with respect to the aforementioned first aspect, apply mutatis mutandis to the method.

Optionally, the multi-material fluidic printing system further comprises a plurality of containers that are capable of holding the plurality of fluid materials, the plurality of containers corresponding to a plurality of cartridges, wherein when at least one sixth end of at least one cartridge is dipped in at least one fluid material held in at least one corresponding container, the method further comprises:
controlling the pressure source to generate a fourth pressure;
controlling the at least one regulator to regulate the fourth pressure received at the at least one first end to obtain a fifth pressure at the at least one second end, wherein the fifth pressure is higher than the fourth pressure; and
controlling the at least one flow selector to selectively distribute the fifth pressure received at the at least one third end to obtain at least one sixth pressure on the at least one fourth end corresponding to the at least one cartridge dipped in the at least one fluid material, wherein when at least one fifth end of the at least one cartridge that is fluidically coupled to the at least one fourth end is subjected to the at least one sixth pressure, the at least one fluid material held in the at least one container is filled into the at least one cartridge from the at least one sixth end.

Optionally, the method further comprises loading the plurality of cartridges in the multi-material fluid printing system. The plurality of cartridges are loaded at a predefined position and at a predefined orientation. Optionally, the plurality of cartridges are loaded using at least one of: the robot, the machine with a robotic arm, the person.

Optionally, the method further comprises controlling at least one of: the at least one third pressure, the at least one sixth pressure, at the plurality of fourth ends, by at least one of: regulating diameters of the plurality of fourth ends, controlling inbuilt regulators that are provided at the plurality of fourth ends.

Optionally, the multi-material fluidic printing system further comprises at least one heating element and at least one cooling element, and wherein the method further comprises controlling the at least one heating element and the at least one cooling element for providing a required temperature at the plurality of fourth ends, the required temperature lying in a range of minus 200 degrees Celsius to 1200 degrees Celsius.

Optionally, the multi-material fluidic printing system further comprises at least one ultraviolet (UV) source that, in operation, generates UV radiations, and wherein the method further comprises controlling the at least one UV source for at least one of: disinfecting the multi-material fluidic printing device, crosslinking a plurality of constituents of a plurality of fluid materials filled in a plurality of cartridges.

DETAILED DESCRIPTION OF THE DRAWINGS

Figure 1B:
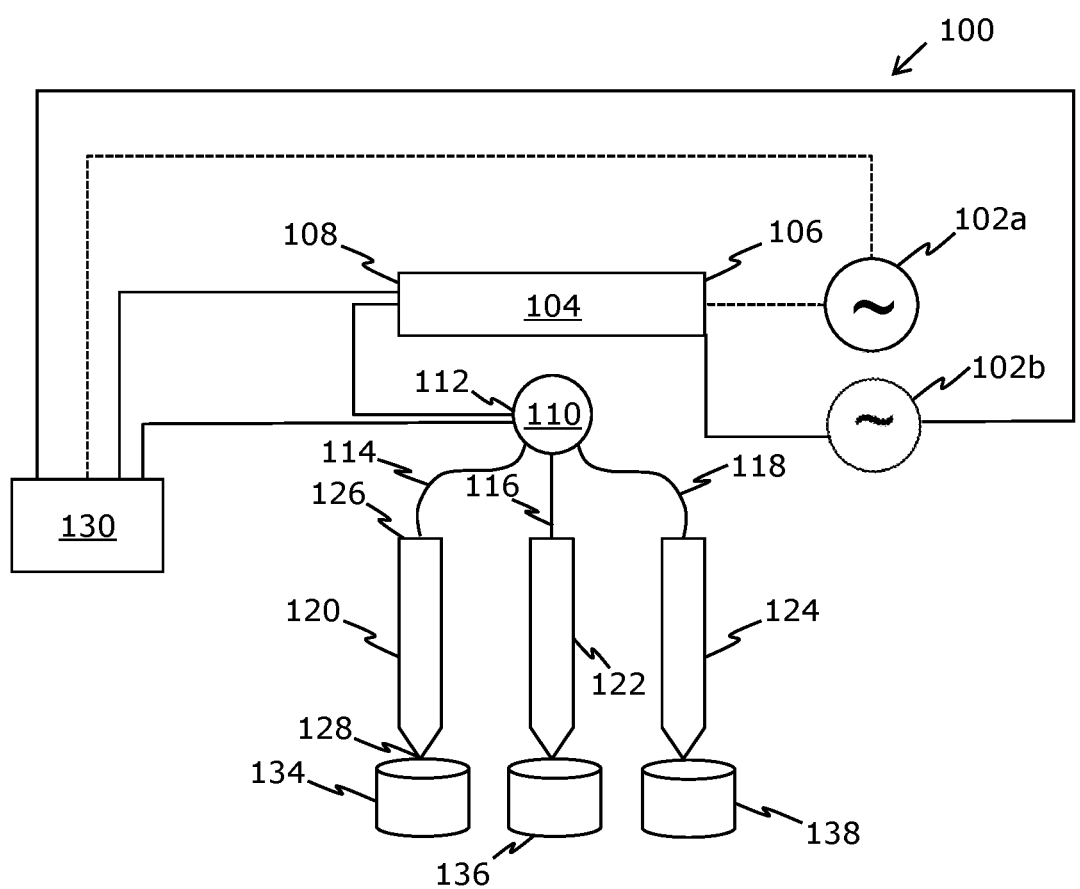

Referring to FIGS. 1A and 1B, illustrated are schematic illustrations of a multi-material fluidic printing system 100, in accordance with different embodiments of the present disclosure. The multi-material fluidic printing system 100 comprises a pressure source (depicted as a pressure source 102a in one embodiment and a pressure source 102b in another embodiment). The pressure source 102a is used for extruding the plurality of fluid materials from the multi-material fluidic printing system 100 whereas the pressure source 102b is used for infusing the plurality of fluid materials from the multi-material fluidic printing system 100. It will be appreciated that, at a given time, only one of the two pressure sources 102a and 102b is connected in the multi-material fluidic printing system 100. The multi-material fluidic printing system 100 also comprises at least one regulator (depicted as a regulator 104) having at least one first end (depicted as a first end 106) and at least one second end (depicted as a second end 108), wherein the first end 106 is fluidically coupled to the pressure source (102a or 102b), The multi-material fluidic printing system 100 also comprises at least one flow selector (depicted as a flow selector 110) having at least one third end (depicted as a third end 112) and a plurality of fourth ends (depicted, for example as three ends 114, 116, and 118), wherein the third end 112 is fluidically coupled to the second end 108. Further, the multi-material fluidic printing system 100 comprises a plurality of cartridges (depicted, for example as three cartridges 120, 122, and 124) that are capable of holding a plurality of fluid materials (not shown), wherein each cartridge has a fifth end and a sixth end (depicted, for example as a fifth end 126 and a sixth end 128 corresponding to the cartridge 120), the fifth end 126 being fluidically coupled to a corresponding fourth end 114 amongst the plurality of fourth ends, and at least one processor (depicted as a processor 130) coupled to the pressure source (102a or 102b), the regulator 104, and the flow selector 110.

In FIG. 1A, the pressure source 102a is coupled (shown as a solid line) to the processor 130. Herein, the pressure source 102a generates a positive pressure for extrusion of the plurality of fluid materials from the plurality of cartridges. For example, a fluid material held in the cartridge 120 may be dispensed from the sixth end 128 onto a fluidic device 132.

In FIG. 1B, the multi-material fluidic printing system 100 further comprises a plurality of containers (depicted, for example as three containers 134, 136, and 138) that are capable of holding the plurality of fluid materials (not shown). The pressure source 102b is coupled to the processor 130. Herein, the pressure source 102b generates a negative pressure for infusion of the plurality of fluid materials into the plurality of cartridges. For example, the plurality of fluid materials held in the containers 134, 136, and 138 are filled into the cartridges 120, 122, and 124, respectively.

FIGS. 1A and 1B are merely examples, which should not unduly limit the scope of the claims herein. A person skilled in the art will recognize many variations, alternatives, and modifications of embodiments of the present disclosure.

Figure 2:
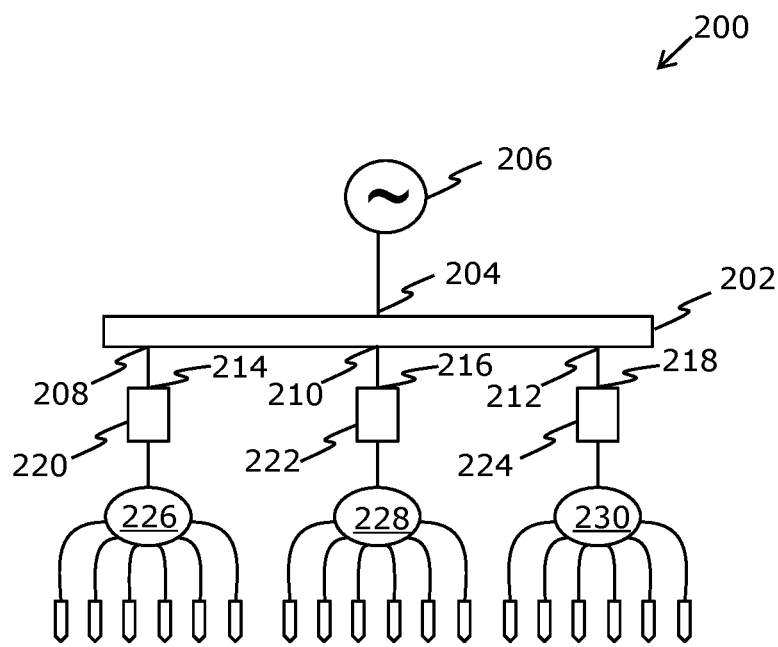
FIG. 2 is a schematic illustration of how at least one fluidic manifold is arranged in a multi-material fluidic printing system, in accordance with an embodiment of the present disclosure.

Referring to FIG. 2, illustrated is a schematic illustration of how at least one fluidic manifold (depicted as a fluidic manifold 202) is arranged in a multi-material fluidic printing system 200, in accordance with an embodiment of the present disclosure. The multi-material fluidic printing system 200 comprises the fluidic manifold 202. The fluidic manifold 202 has a seventh end 204 fluidically coupled to a pressure source 206, and a plurality of eighth ends (depicted, for example as three eighth ends 208, 210, 212) fluidically coupled to first ends (depicted, for example as three first ends 214, 216, and 218) of a plurality of regulators (depicted, for example as three regulators 220, 222, and 224). The multi-material fluidic printing system 200 further comprises three flow selectors 226, 228 and 230 fluidically coupled to the three regulators 220, 222 and 224.

FIG. 2 is merely an example, which should not unduly limit the scope of the claims herein. A person skilled in the art will recognize many variations, alternatives, and modifications of embodiments of the present disclosure.

Figure 3:
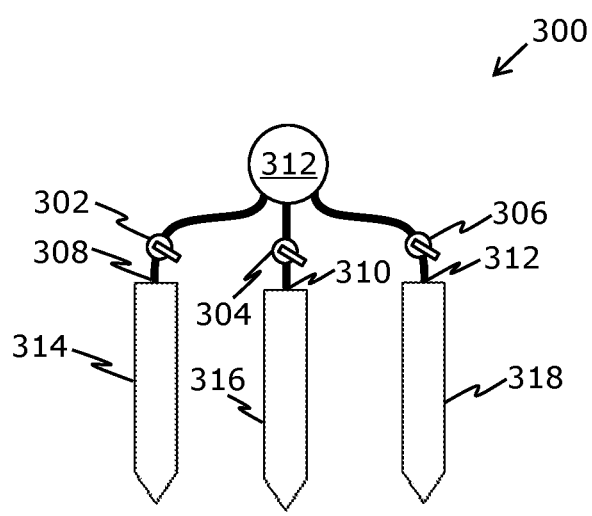
FIG. 3 is a schematic illustration of how inbuilt regulators are arranged in a multi-material fluidic printing system, in accordance with another embodiment of the present disclosure.

Referring to FIG. 3, illustrated is a schematic illustration of how inbuilt regulators (depicted, for example as three inbuilt regulators 302, 304, and 306) are arranged in a multi-material fluidic printing system 300, in accordance with another embodiment of the present disclosure. The inbuilt regulators 302, 304, and 306 are provided at a plurality of fourth ends (depicted, for example as three fourth ends 308, 310, 312) of at least one flow selector (depicted as a flow selector 312). The fourth ends 308, 310, and 312 are fluidically coupled with a plurality of cartridges (depicted, for example as three cartridges 314, 316, and 318).

FIG. 3 is merely an example, which should not unduly limit the scope of the claims herein. A person skilled in the art will recognize many variations, alternatives, and modifications of embodiments of the present disclosure.

Figure 4:
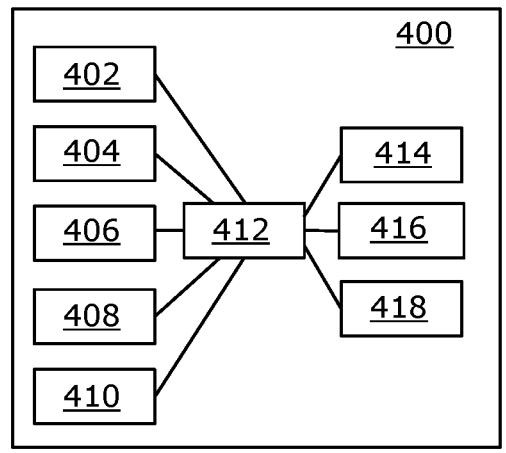
FIG. 4 illustrates an architecture of a multi-material fluidic printing system, in accordance with yet another embodiment of the present disclosure.

Referring to FIG. 4, illustrated is an architecture of a multi-material fluidic printing system 400, in accordance with an embodiment of the present disclosure. The multi-material fluidic printing system 400 comprises a pressure source 402, at least one regulator (depicted as a regulator 404), at least one flow selector (depicted as a flow selector 406), a plurality of cartridges (depicted as two cartridges 408, 410), and at least one processor (depicted as a processor 412). The multi-material fluidic printing system 400 further comprises at least one UV source (depicted as a UV source 414), at least one heating element (depicted as a heating element 416) and at least one cooling element (depicted as a cooling element 418) coupled to the processor 412.

FIG. 4 is merely an example, which should not unduly limit the scope of the claims herein. A person skilled in the art will recognize many variations, alternatives, and modifications of embodiments of the present disclosure.

Figure 5:
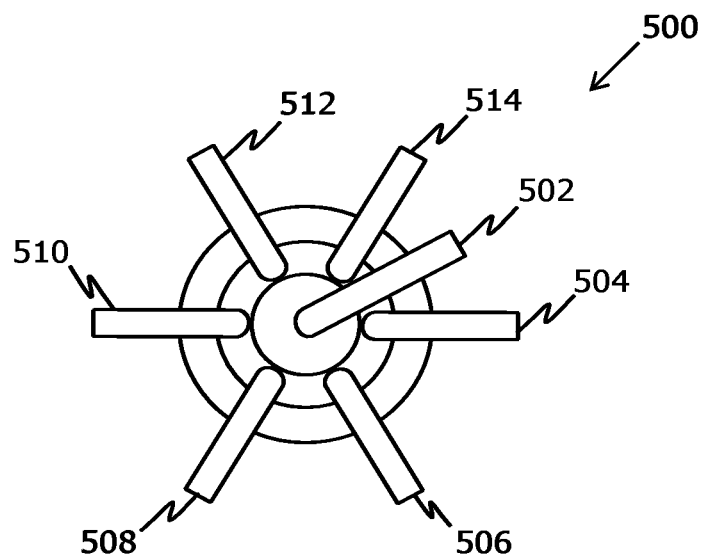
FIG. 5 illustrates an implementation of at least one flow selector as a solenoid valve, in accordance with an embodiment of the present disclosure.

Referring to FIG. 5 illustrated is an implementation of at least one flow selector as a solenoid valve 500, in accordance with an embodiment of the present disclosure. The solenoid valve 500 comprises a plurality of ports (depicted, for example as seven ports 502, 504, 506, 508, 510, 512, and 514). Herein, at least one third end is depicted as the port 502 and a plurality of fourth ends are depicted as ports 504, 506, 508, 510, 512 and 514. In this regard, the port 502 is connected with one of the six ports at one time. Therefore, the solenoid array allows extrusion of only one fluid material held in one cartridge corresponding to one port fluidically coupled with the cartridge.

FIG. 5 is merely an example, which should not unduly limit the scope of the claims herein. A person skilled in the art will recognize many variations, alternatives, and modifications of embodiments of the present disclosure.

Figure 6:
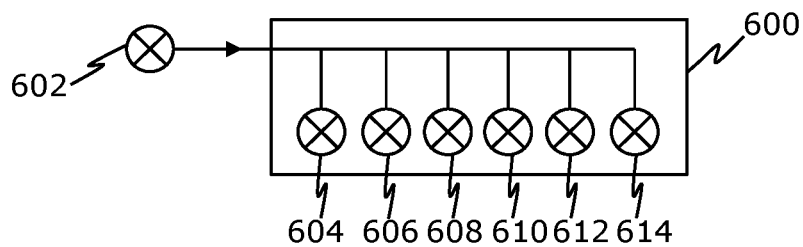
FIG. 6 illustrates an implementation of at least one flow selector as a solenoid array, in accordance with another embodiment of the present disclosure.

Referring to FIG. 6, illustrated is an implementation of at least one flow selector as a solenoid array 600, in accordance with another embodiment of the present disclosure. The solenoid array 600 comprises at least one third end (depicted as a third end 602) and a plurality of fourth ends (depicted, for example as six fourth ends 604, 606, 608, 610, 612 and 614). In this regard, the solenoid array allows extrusion of a plurality of fluid materials held in a plurality of cartridges corresponding to the plurality of fourth ends.

FIG. 6 is merely an example, which should not unduly limit the scope of the claims herein. A person skilled in the art will recognize many variations, alternatives, and modifications of embodiments of the present disclosure.

Figure 7:
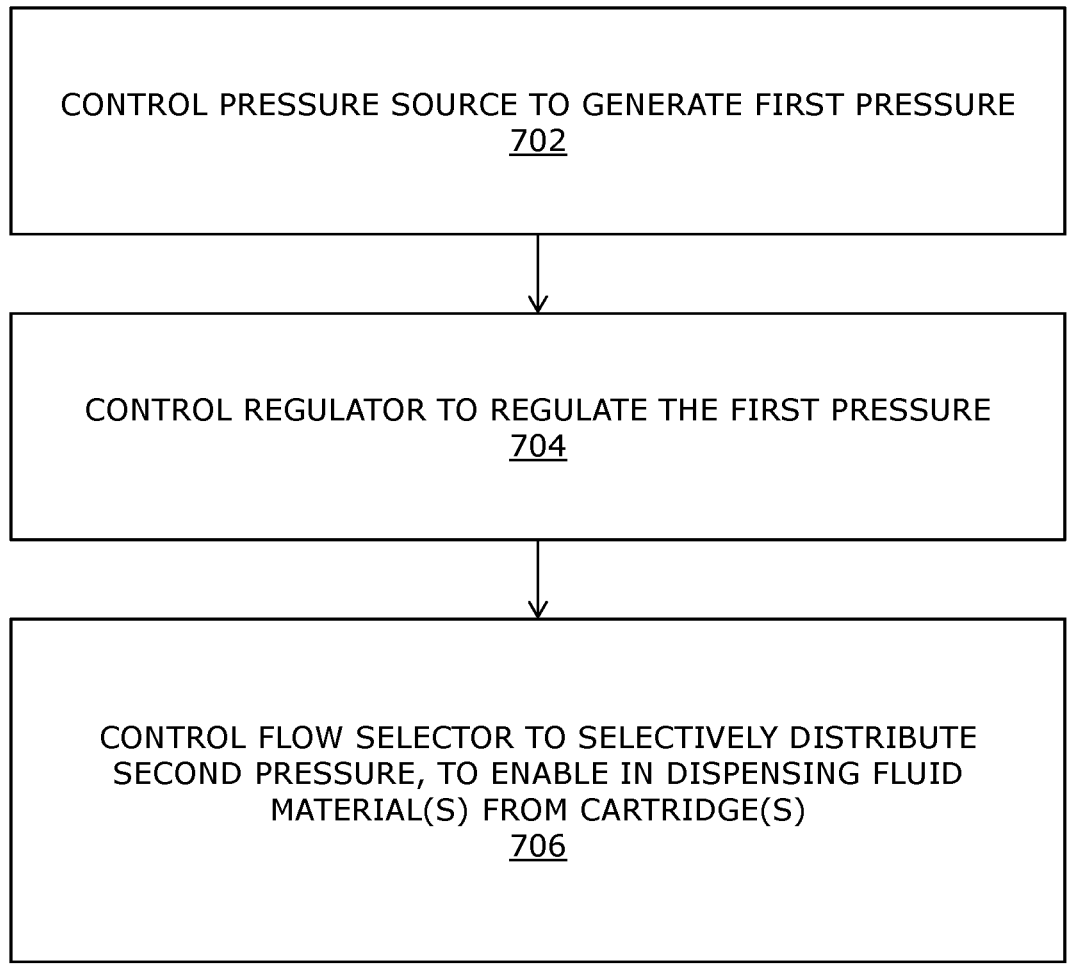
FIG. 7 illustrates a flow chart depicting steps of a method for printing using a multi-material fluidic printing system, in accordance with an embodiment of the present disclosure.

Referring to FIG. 7, illustrated is a flow chart depicting steps of a method for printing using a multi-material fluidic printing system, in accordance with an embodiment of the present disclosure. At step 702, a pressure source is controlled for generating a first pressure. At step 704, at least one regulator is controlled to regulate the first pressure received on at 1o least one first end thereof for obtaining a second pressure on at least one second end thereof, the at least one first end being fluidically coupled to the pressure source, wherein the second pressure is less than the first pressure. At step 706, at least one flow selector is controlled to selectively distribute the second pressure received on at least one third end thereof for obtaining at least one third pressure on at least one fourth end amongst a plurality of fourth ends thereof, the at least one third end being fluidically coupled to the at least one second end, wherein when at least one fifth end of at least one cartridge that is fluidically coupled to the at least one fourth end is subjected to the at least one third pressure, at least one fluid material held in the at least one cartridge corresponding to the at least one fourth end is dispensed from at least one sixth end of the at least one cartridge onto a fluidic device.

The aforementioned steps are only illustrative, and other alternatives can also be provided where one or more steps are added, one or more steps are removed, or one or more steps are provided in a different sequence without departing from the scope of the claims herein.

Figure 8:
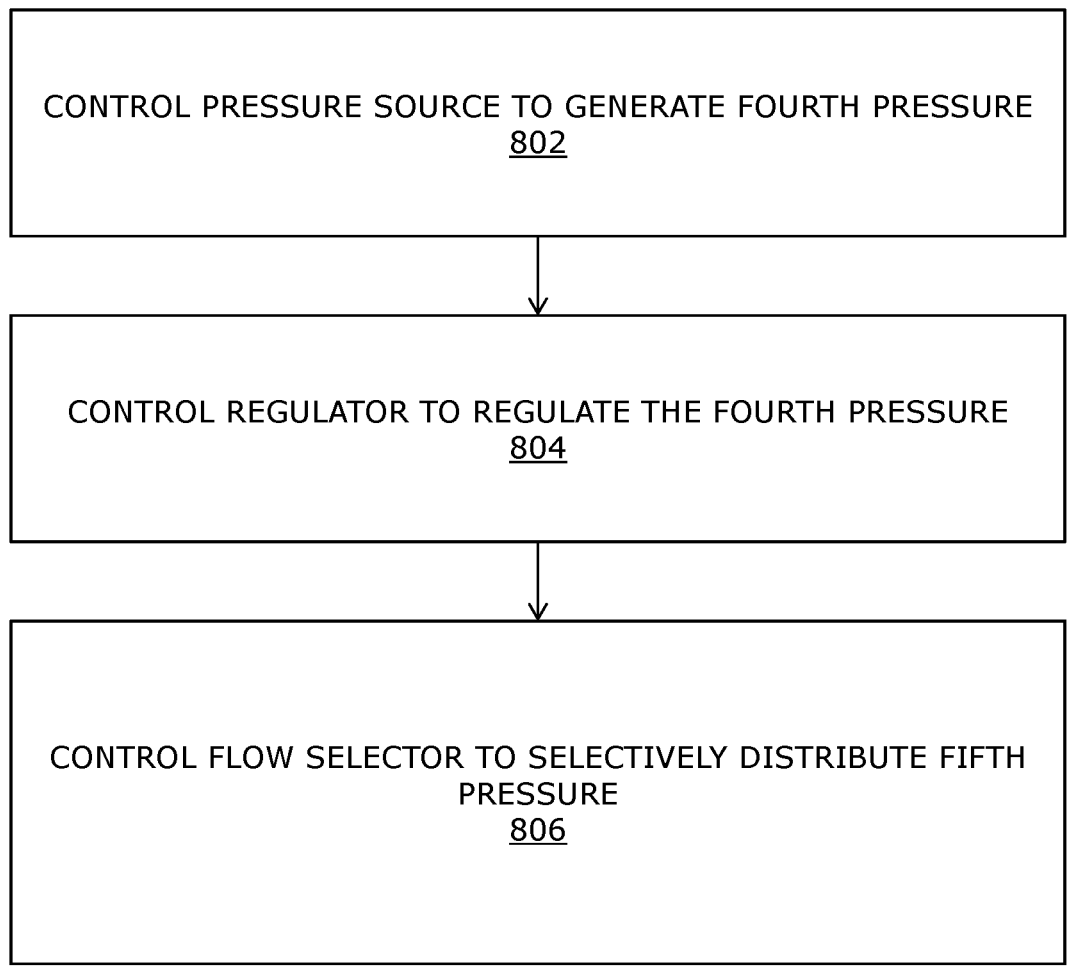
FIG. 8 illustrates a flow chart depicting process steps for infusion of fluid materials into a multi-material fluidic printing system, in accordance with an embodiment of the present disclosure.

Referring to FIG. 8, illustrated is a flow chart depicting process steps for infusion of fluid materials into a multi-material fluidic printing system, in accordance with an embodiment of the present disclosure. At step 802, a pressure source is controlled to generate a fourth pressure. At step 804, at least one regulator is controlled to regulate the fourth pressure received at the at least one first end to obtain a fifth pressure at the at least one second end, wherein the fifth pressure is higher than the fourth pressure. At step 806, at least one flow selector is controlled to selectively distribute the fifth pressure received at the at least one third end to obtain at least one sixth pressure on the at least one fourth end corresponding to the at least one cartridge dipped in the at least one fluid material, wherein when at least one fifth end of the at least one cartridge that is fluidically coupled to the at least one fourth end is subjected to the at least one sixth pressure, the at least one fluid material held in the at least one container is filled into the at least one cartridge from the at least one sixth end.

The aforementioned steps are only illustrative, and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A multi-material fluidic printing system comprising:
   a pressure source;
   at least one regulator having at least one first end and at least one second end, wherein the at least one first end is fluidically coupled to the pressure source;
   at least one flow selector having at least one third end and a plurality of fourth ends, wherein the at least one third end is fluidically coupled to the at least one second end;
   a plurality of cartridges that are capable of holding a plurality of fluid materials, wherein each cartridge has a fifth end and a sixth end, the fifth end being fluidically coupled to a corresponding fourth end amongst the plurality of fourth ends; and
   at least one processor coupled to the pressure source, the at least one regulator, and the at least one flow selector, wherein the at least one processor is configured to:
   control the pressure source to generate a first pressure;
   control the at least one regulator to regulate the first pressure received at the at least one first end to obtain a second pressure at the at least one second end, wherein the second pressure is less than the first pressure; and
   control the at least one flow selector to selectively distribute the second pressure received at the at least one third end to obtain at least one third pressure on at least one fourth end amongst the plurality of fourth ends, wherein when at least one fifth end fluidically coupled to the at least one fourth end is subjected to the at least one third pressure, at least one fluid material held in at least one cartridge corresponding to the at least one fourth end is dispensed from at least one sixth end of the at least one cartridge onto a fluidic device.

2. A multi-material fluidic printing system according to claim 1, further comprising a plurality of containers that are capable of holding the plurality of fluid materials, the plurality of containers corresponding to the plurality of cartridges, wherein when at least one sixth end of at least one cartridge is dipped in at least one fluid material held in at least one corresponding container, the at least one processor is further configured to:
   control the pressure source to generate a fourth pressure;
   control the at least one regulator to regulate the fourth pressure received at the at least one first end to obtain a fifth pressure at the at least one second end, wherein the fifth pressure is higher than the fourth pressure; and
   control the at least one flow selector to selectively distribute the fifth pressure received at the at least one third end to obtain at least one sixth pressure on the at least one fourth end corresponding to the at least one cartridge dipped in the at least one fluid material, wherein when at least one fifth end of the at least one cartridge that is fluidically coupled to the at least one fourth end is subjected to the at least one sixth pressure, the at least one fluid material held in the at least one container is filled into the at least one cartridge from the at least one sixth end.

3. A multi-material fluidic printing system according to claim 1, further comprising at least one fluidic manifold when the at least one regulator comprises a plurality of regulators, wherein the at least one fluidic manifold has: a seventh end fluidically coupled to the pressure source, and a plurality of eighth ends fluidically coupled to first ends of the plurality of regulators.

4. A multi-material fluidic printing system according to claim 1, wherein at least one of: the at least one third pressure, the at least one sixth pressure, at the plurality of fourth ends is controlled by regulating diameters of the plurality of fourth ends.

5. A multi-material fluidic printing system according to claim 1, further comprising inbuilt regulators that are capable of controlling at least one of: the at least one third pressure, the at least one sixth pressure, at the plurality of fourth ends, wherein the inbuilt regulators are provided at the plurality of fourth ends.

6. A multi-material fluidic printing system according to claim 1, further comprising at least one heating element and at least one cooling element coupled to the at least one processor wherein the at least one processor is configured to control the at least one heating element and the at least one cooling element to provide a required temperature at the plurality of fourth ends, the required temperature lying in a range of minus 200 degrees Celsius to 1200 degrees Celsius.

7. A multi-material fluidic printing system according to claim 1, wherein the at least one flow selector is implemented as at least one of: a switching valve comprising a plurality of ports, a solenoid array.

8. A multi-material fluidic printing system according to claim 1, wherein the pressure source is implemented as one of: a compressor, a vacuum pump.

9. A multi-material fluidic printing system according to claim 1, further comprising at least one ultraviolet (UV) source that, in operation, generates UV radiations, wherein the at least one UV source is controllable for at least one of: disinfecting the multi-material fluidic printing device, cross-linking a plurality of constituents of the plurality of fluid materials filled in the plurality of cartridges.

10. A method of printing using a multi-material fluidic printing system of claim 1, the method comprising:
   controlling a pressure source for generating a first pressure;
   controlling at least one regulator to regulate the first pressure received on at least one first end thereof for obtaining a second pressure on at least one second end thereof, the at least one first end being fluidically coupled to the pressure source, wherein the second pressure is less than the first pressure; and
   controlling at least one flow selector to selectively distribute the second pressure received on at least one third end thereof for obtaining at least one third pressure on at least one fourth end amongst a plurality of fourth ends thereof, the at least one third end being fluidically coupled to the at least one second end, wherein when at least one fifth end of at least one cartridge that is fluidically coupled to the at least one fourth end is subjected to the at least one third pressure, at least one fluid material held in the at least one cartridge corresponding to the at least one fourth end is dispensed from at least one sixth end of the at least one cartridge onto a fluidic device.

11. A method according to claim 10, wherein the multi-material fluidic printing system further comprises a plurality of containers that are capable of holding the plurality of fluid materials, the plurality of containers corresponding to a plurality of cartridges, wherein when at least one sixth end of at least one cartridge is dipped in at least one fluid material held in at least one corresponding container, the method further comprises:
- controlling the pressure source to generate a fourth pressure;
- controlling the at least one regulator to regulate the fourth pressure received at the at least one first end to obtain a fifth pressure at the at least one second end, wherein the fifth pressure is higher than the fourth pressure; and
- controlling the at least one flow selector to selectively distribute the fifth pressure received at the at least one third end to obtain at least one sixth pressure on the at least one fourth end corresponding to the at least one cartridge dipped in the at least one fluid material, wherein when at least one fifth end of the at least one cartridge that is fluidically coupled to the at least one fourth end is subjected to the at least one sixth pressure, the at least one fluid material held in the at least one container is filled into the at least one cartridge from the at least one sixth end.

12. A method according to claim 10, further comprising controlling at least one of: the at least one third pressure, the at least one sixth pressure, at the plurality of fourth ends, by at least one of: regulating diameters of the plurality of fourth ends, controlling inbuilt regulators that are provided at the plurality of fourth ends.

13. A method according to claim 10, wherein the multi-material fluidic printing system further comprises at least one heating element and at least one cooling element, and wherein the method further comprises controlling the at least one heating and cooling element for providing a required temperature at the plurality of fourth ends, the required temperature lying in a range of minus 200 degrees Celsius to 1200 degrees Celsius.

14. A method according to claim 10, wherein the multi-material fluidic printing system further comprises at least one ultraviolet (UV) source that, in operation, generates UV radiations, and wherein the method further comprises controlling the at least one UV source for at least one of: disinfecting the multi-material fluidic printing device, cross-linking a plurality of constituents of a plurality of fluid materials filled in a plurality of cartridges.

* * * * *